(12) United States Patent
Cooper

(10) Patent No.: US 7,172,705 B2
(45) Date of Patent: Feb. 6, 2007

(54) SKIMMER

(76) Inventor: Michele Cooper, 1 Bruce Path, Short Hills, NJ (US) 07078

( * ) Notice: Subject to any disclaimer, the term of this patent is extended or adjusted under 35 U.S.C. 154(b) by 0 days.

(21) Appl. No.: 11/042,711

(22) Filed: Jan. 25, 2005

(65) Prior Publication Data

US 2005/0230326 A1    Oct. 20, 2005

Related U.S. Application Data

(60) Provisional application No. 60/563,507, filed on Apr. 19, 2004.

(51) Int. Cl.
*C02F 1/40* (2006.01)
(52) U.S. Cl. .................... 210/776; 99/496
(58) Field of Classification Search ............... 210/776, 210/513, 515, 538
See application file for complete search history.

(56) References Cited

U.S. PATENT DOCUMENTS

| | | | | | |
|---|---|---|---|---|---|
| 858,291 | A | * | 6/1907 | Irby | 210/470 |
| 1,021,133 | A | * | 3/1912 | Chaloud | 99/418 |
| 1,053,780 | A | * | 2/1913 | Brooks | 210/469 |
| 1,222,056 | A | * | 4/1917 | Wesley | 99/450 |
| 1,226,722 | A | * | 5/1917 | Sullivan | 141/268 |
| 1,228,816 | A | * | 6/1917 | Peterson | 99/450 |
| 1,273,119 | A | * | 7/1918 | Allis | 99/418 |
| 1,301,065 | A | * | 4/1919 | Kunst | 425/311 |
| 1,445,788 | A | * | 2/1923 | Millican | 99/418 |
| 1,460,639 | A | * | 7/1923 | Braddick | 126/369 |
| 1,471,361 | A | * | 10/1923 | Sarles | 209/372 |
| 1,672,738 | A | * | 6/1928 | Stampley | 99/411 |
| 1,732,028 | A | * | 10/1929 | Reiner | 239/36 |
| 1,909,983 | A | * | 5/1933 | Powell | 220/529 |
| 2,544,846 | A | * | 3/1951 | Mach | 99/355 |
| 2,575,768 | A | * | 11/1951 | Pearsall | 210/95 |
| 2,667,117 | A | * | 1/1954 | Millard et al. | 99/418 |
| 2,795,119 | A | * | 6/1957 | Bair | 30/325 |
| 3,314,358 | A | * | 4/1967 | Burns | 99/349 |
| 3,326,384 | A | * | 6/1967 | Wessels | 210/470 |
| D210,399 | S | * | 3/1968 | Wichmann | D7/691 |
| 3,392,845 | A | * | 7/1968 | Shapiro et al. | 210/470 |
| 4,106,486 | A | * | 8/1978 | Lee | 126/369 |
| 4,271,011 | A | * | 6/1981 | Spencer et al. | 209/236 |
| 4,402,433 | A | * | 9/1983 | Webinger | 222/485 |
| 4,452,581 | A | * | 6/1984 | Panehal | 425/464 |
| 4,603,714 | A | * | 8/1986 | Marotta | 141/383 |
| D313,727 | S | * | 1/1991 | Gamez | D7/360 |
| 5,077,900 | A | * | 1/1992 | Jamentz | 30/326 |
| 5,084,177 | A | * | 1/1992 | Keene | 210/470 |
| 5,199,347 | A | * | 4/1993 | Chen | 99/418 |
| 5,199,349 | A | * | 4/1993 | Hansen | 99/495 |
| 5,247,878 | A | * | 9/1993 | Anderson | 99/495 |
| 5,367,775 | A | * | 11/1994 | Tong et al. | 30/324 |
| D357,389 | S | * | 4/1995 | McGeary | D7/667 |
| 5,458,054 | A | * | 10/1995 | Yu | 99/446 |
| 5,510,028 | A | * | 4/1996 | Kuhlman | 210/307 |
| 5,526,737 | A | * | 6/1996 | Betzen | 99/495 |

(Continued)

*Primary Examiner*—Robert James Popovics
*Assistant Examiner*—T. Woodruff
(74) *Attorney, Agent, or Firm*—Philip M. Weiss; Weiss & Weiss

(57) ABSTRACT

A skimmer device and a method for skimming a liquid, foam, fat or other solid or liquid material or anything else that a user wants to remove or separate from a remaining liquid or solid that is left in a container.

1 Claim, 4 Drawing Sheets

U.S. PATENT DOCUMENTS

| | | | |
|---|---|---|---|
| D388,279 S * | 12/1997 | Candianides | D7/391 |
| 5,913,966 A * | 6/1999 | Arnone et al. | 99/413 |
| 5,947,171 A * | 9/1999 | Woodruff | 141/346 |
| 5,974,953 A * | 11/1999 | Messerli | 99/340 |
| 6,036,038 A * | 3/2000 | Lovelace et al. | 215/391 |
| 6,050,309 A * | 4/2000 | Woodruff | 141/346 |
| 6,068,870 A * | 5/2000 | Strauss | 426/392 |
| 6,085,809 A * | 7/2000 | Woodruff | 141/346 |
| D435,759 S * | 1/2001 | Durbin et al. | D7/396.2 |
| 6,244,518 B1 * | 6/2001 | Pogue | 239/36 |
| 6,263,928 B1 * | 7/2001 | Woodruff | 141/346 |
| 6,305,444 B1 * | 10/2001 | Woodruff | 141/346 |
| D459,940 S * | 7/2002 | Stoll et al. | D7/391 |
| 6,443,053 B1 * | 9/2002 | Rossi | 99/340 |
| 6,443,313 B1 * | 9/2002 | Uli | 210/470 |
| 6,543,496 B2 * | 4/2003 | Woodruff | 141/346 |
| 6,722,043 B2 * | 4/2004 | Teng | 30/324 |
| 6,732,772 B2 * | 5/2004 | Woodruff | 141/346 |
| 6,869,531 B2 * | 3/2005 | Chiang | 210/242.3 |
| 2001/0054358 A1 * | 12/2001 | Rigney | 99/403 |
| 2003/0188439 A1 * | 10/2003 | Teng | 30/324 |
| 2005/0230326 A1 * | 10/2005 | Cooper | 210/776 |

* cited by examiner

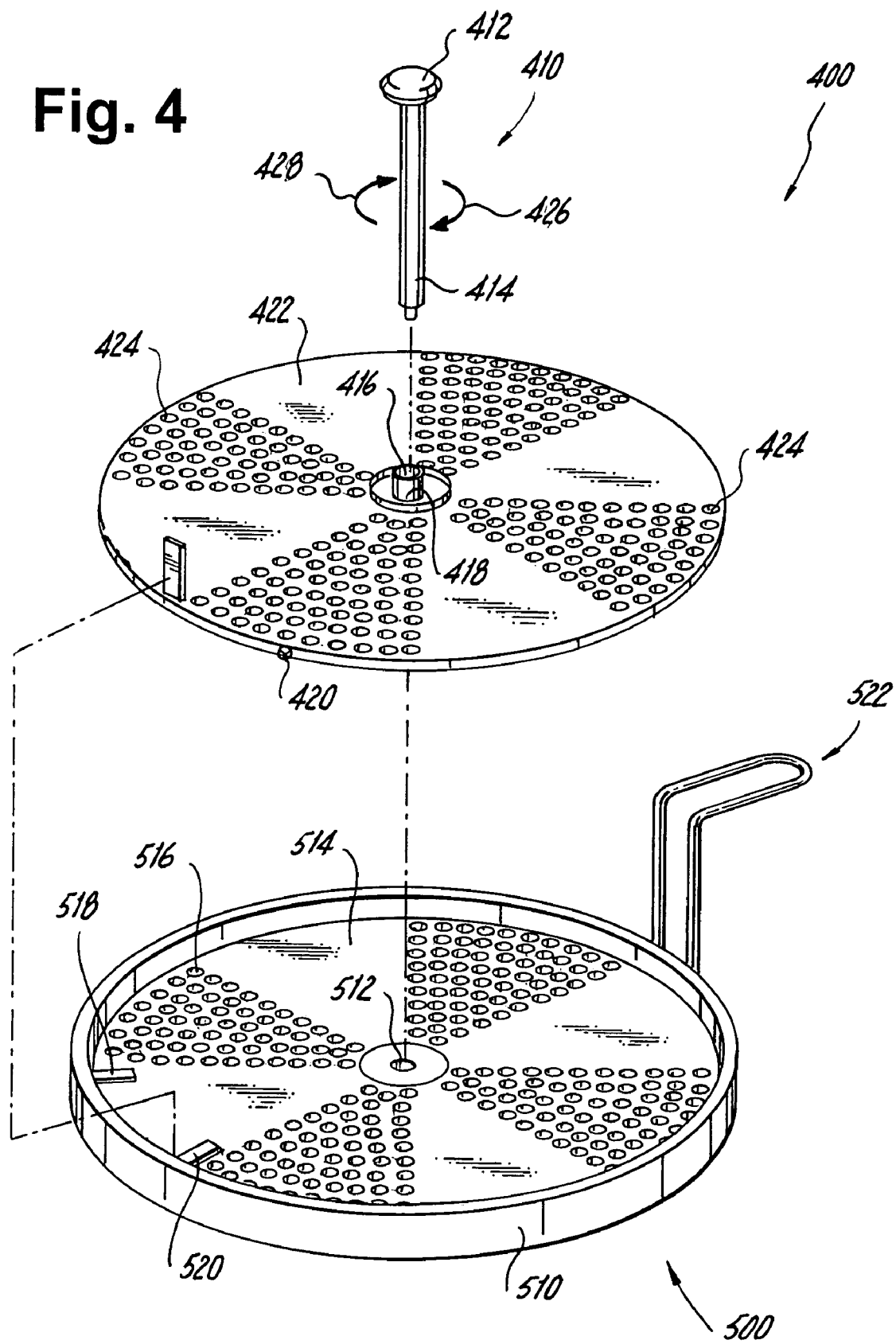

SKIMMER

RELATED APPLICATIONS

The present application claims priority to provisional patent application Ser. No. 60/563,507, filed Apr. 19, 2004.

FIELD OF THE INVENTION

The present invention relates to a skimmer device and a method for skimming a liquid, foam, fat or other solid or liquid material or anything else that a user wants to remove or separate from a remaining liquid or solid that is left in the container.

BACKGROUND OF THE INVENTION

U.S. Pat. No. 5,077,900 relates to a fat skimmer in the form of a ladle having a deep vessel bowl with a rim at which there are ports for the transfer of surrounding fatty liquid into the vessel, determined by manipulation controlled by a locator associated with the rim.

U.S. Pat. Nos. D252,068, D493,070 and D357,389 relate to fat skimmer devices to a fat skimmer for separating an unwanted fat liquid from a wanted liquid. The device consists of a transparent cone shaped jug for storing the unwanted fat liquid and the wanted fat liquid that is to be separated. The jug has a tapered exhaust conduit formeriphery partially submerged in the liquid body, a fat removal opening is provided in the plate portion co-axially with respect to the axis of rotation of the plate, a spiral shaped fat capture flange extends forwardly from the surface of the plate and has an inner end at the fat removal opening entered in the plate and an outer leading end edge positioned radially outward from the fat removal opening to engage and remove fat from the surface of the liquid body and deliver it to the fat removal opening.

U.S. Pat. No. 6,722,043 and publication application 2003/0188439 relate to a fat skimming ladle to use for removal of fat and other floating debris off of cooked soup stock. The ladle has a conduit structure with inlet located at the interior bottom of the ladle bowl and the outlet is located behind the proximal end of the handle.

The removal of fats, oils and grease floating in pans and pots where meats and pastas are cooked is troublesome. In the past, the process is to pour it off or scoop it off. Spoons, cups and ladles have been used. Hot fats, grease and oil rise and form a uniform layer on underlying liquids during roasting and cooking.

SUMMARY OF THE INVENTION

The present invention relates to a skimmer device and a method for skimming a liquid, foam, fat or other solid or liquid material or anything else that a user wants to remove or separate from a remaining liquid or solid that is left in the container. The present invention relates to a skimmer device and a method for skimming a layer of fat, oil, or other similar layer that is floating on top of another liquid. It is an object of the present invention for the other liquid to be water or soup or other similar substance. It is an object of the present invention for the device to be placed in a pot or other container. It is an object of the present invention for the device to be used to skim a layer of foam, such as that formed at the top of a pot of cooked pasta, from the surface of a liquid. It is an object of the present invention for the invention to comprise a flange around the outside to prevent the device from dropping to the bottom of the pot.

The present invention relates to a utensil which comprises a strainer, a reservoir, which may be constructed as an integral piece with the strainer, a stopper, a handle, and a stopper control rod. The size of the skimmer closely matches the size of the pot that it will be use with. It is an object of the present invention for the strainer to be available in different sizes or adjustable to accommodate different size pots.

The strainer is the portion of the skimmer with holes in it to permit entry of fat, liquid or foam or other similar substance but keeps out solids such as vegetables. The surface of the strainer is held parallel to the surface of the liquid to be skimmed. It is an object of the present invention for the strainer to be of a circular shape. It is an object of the present invention for the diameter of the strainer to closely approximate, but be slightly less than, the diameter of the pot that is being skimmed.

The reservoir is the portion of the skimmer that holds the fatty liquid, foam, or other similar substance that is removed from the pot. It is made from the side wall of the utensil, working in conjunction with the bottom of the utensil, formed by the combination of the strainer and stopper. In the prior art, the reservoir is in a location that is separated from the strainer holes, the fat enters the strainer holes and runs off into a separate reservoir. It is an object of the present invention for the reservoir to be collocated with the strainer holes, located in the same place where the fat enters from the strainer.

The stopper is the rotatable, slidable, or otherwise positionable piece of material that opens the holes in the strainer to permit the ingress of the liquid, fat, foam or other similar material to be removed, or alternatively close the holes in the strainer, allowing the skimmed liquid to be retained in the reservoir without draining out through the holes in the strainer. It is an object of the present invention for the stopper to be positioned above or below the strainer. It is an object of the present invention for the stopper to sit above the strainer within the reservoir. The holes in the stopper are the same size and in the same relative position as the holes in the strainer, when the stopper is aligned in the open position. When the stopper is moved or rotated into the closed position, the solid portions of the stopper completely block the holes in the strainer. The surface of the stopper forms a tight seal against surface of the strainer in the closed position, to prevent leakage of liquid from the reservoir when the skimmer is withdrawn from the pot. It is an object of the present invention for the stopper to be rotated or slid into position via the action of the stopper control rod. It is an object of the present invention for the stopper to comprise a thin, round, plate made of either a hard material, such as metal or plastic, or of a gasket-like material, with an array of holes matching the holes in the strainer.

It is an object of the present invention for the center of the stopper to be aligned with the center of the strainer, via a common pivot point. It is an object of the present invention for the stopper to be made from a plurality of solid hole plugs that may be lifted above or lowered into the holes in the strainer in tandem in order to open or close the strainer.

The handle is used for lowering the skimmer into the pot and for holding it in position first with the stopper open and then when the stopper is closed. The handle is also used for removing the skimmer from the pot in order to remove the liquid, fat, foam or other similar substance. It is an object of the present invention for the handle to be long enough so that the skimmer may be placed onto the surface of the liquid in the pot, whether the pot is full or only partially full.

The stopper control rod is the mechanism used to position the stopper in the open or closed position. It is an object of the present invention for the stopper control rod to rotate, lift or drop the stopper into the proper position. It is an object of the present invention for the turning rod to be an integral part of the handle. It is an object of the present invention for the rod to have a knob at its top to assist the user in rotating or changing the position of the rod. It is an object of the present invention for the rod to slide, click, snap, rotate or drop the stopper into alignment.

It is an object of the present invention for the component pieces of the skimmer to be disassembled to permit easy cleaning.

The present invention relates to a method for skimming a liquid, foam or other similar substance which floats on top of another liquid comprising: opening the stopper by aligning the stopper holes with the strainer holes. The device is then partially lowered via a handle into a container of liquid, using the handle to hold the bottom of the skimmer just below the top surface of the liquid. This forces the top layer of liquid up through the holes in the strainer at the bottom of the device. The side wall of the reservoir is aligned with the inside wall of the container with only a small clearance between the reservoir wall and the container wall, which keeps the bottom face of the strainer parallel to the top surface of the container's liquid. The top of liquid enters the reservoir area, which is above and to the sides of the holes in the strainer. When sufficient liquid, foam, fat or similar substance has entered the reservoir, the user rotates, or otherwise positions the stopper via the stopper control rod so that it blocks the holes in the strainer, trapping the liquid, foam, fat or other similar substance within the reservoir. The user then withdraws the skimmer from the container, and dispose of the skimmed liquid, fat, foam or similar substance. The user can repeat the operation to remove any liquid, foam, fat or similar substance that should have been removed.

The present invention can be used at the time of cooking, before adding solid materials such as bones or vegetables to a liquid material that one may want to remove after cooking. In this instance, the user would first place the skimmer into a pot, either with or without the liquid in the open position. The user could then add the solid materials such as bones or vegetables or meats (as in preparing a gravy) and commence with the cooking of the liquid. Once cooked, the skimmer can be removed in the open position allowing for the removal of the solids from the liquid.

BRIEF DESCRIPTION OF DRAWINGS

FIG. 4 is an exploded view of the present invention.

DETAILED DESCRIPTION OF THE INVENTION

Figure 1:
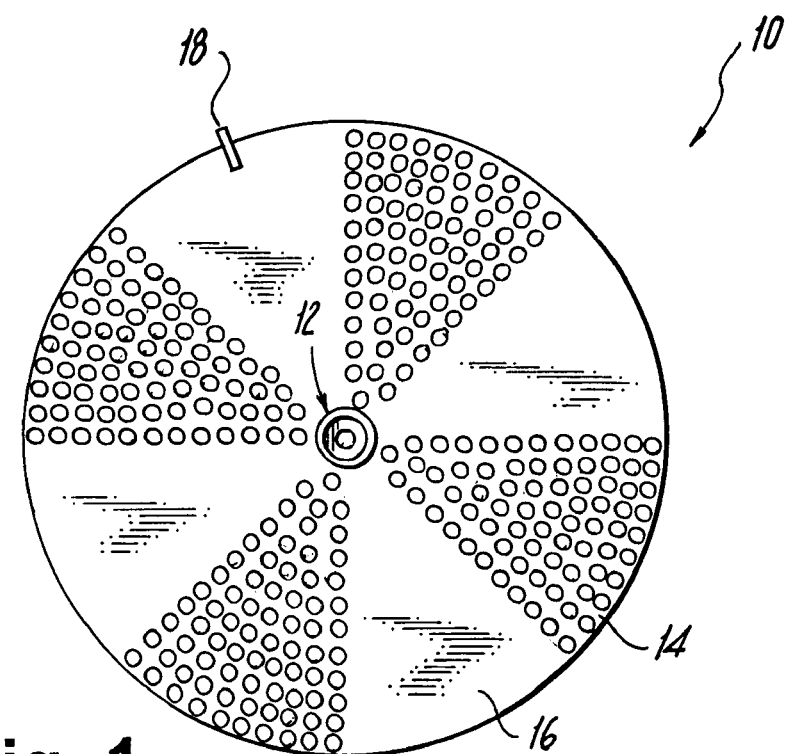
FIG. 1 is a plan view of the present invention.

FIG. 1 shows a skimming device 10 being of a round or circular shape having a center pivot pin 12, stopper holes 14 and solid area 16. The device further comprises a mechanical rotation stop 18. The device 10 can be divided into a different number of segments which have various hole sizes or shapes.

Figure 2:
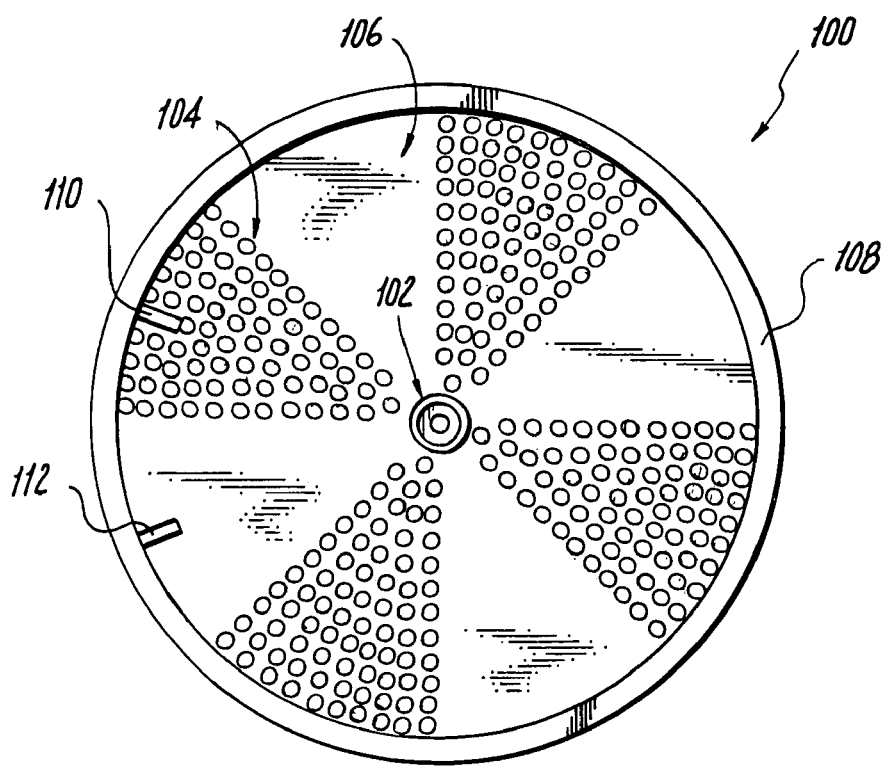
FIG. 2 is a plan view of the present invention.

FIG. 2 shows a skimming device 100 having a center pivot hole 102, strainer holes 104 and solid area 106. FIG. 2 further comprises a reservoir wall 108. The mechanical stops 110 and 112 limit the rotation of the device 100.

Figure 3A:
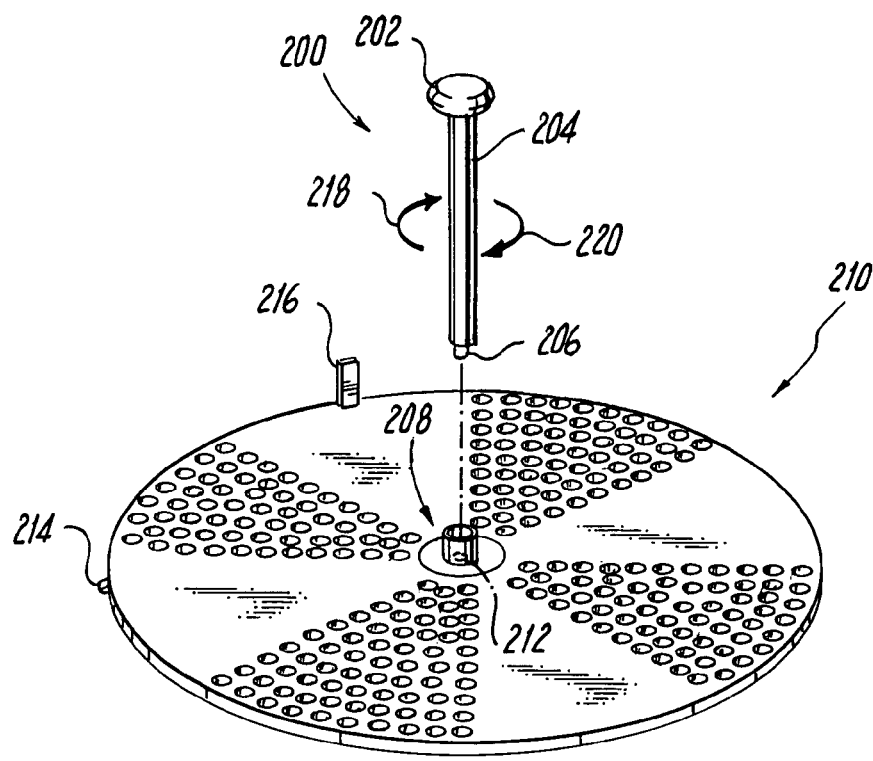
FIGS. 3a and 3b show the stopper control rod of the present invention.

FIG. 3a shows a stopper control rod 200 comprising a handle 202, rod 204 and a key 206 which is inserted into the flange seat 208. The flange seat 208 is for a fixed or removable stopper control rod. Skimming device 210 has a pivot 212 which is located under the center of the flange. Skimming device 210 also has a round stopper 214 and a mechanical rotational stop pin 216. The device is opened by turning the device following arrow 220 and closed following arrow 218.

Figure 3B:
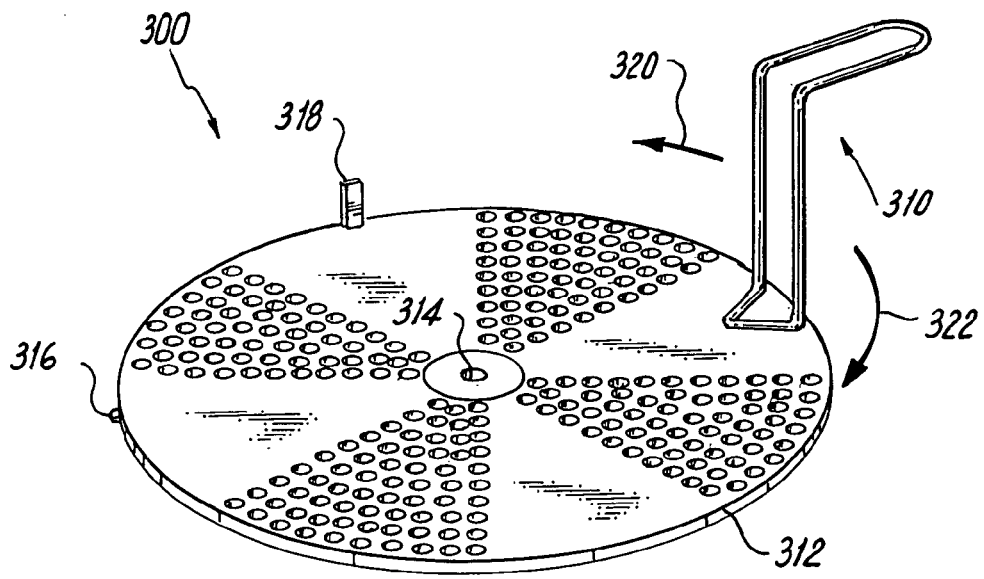

FIG. 3b shows device 300 having a wire handle shaped stopper control rod 310. The stopper control rod 310 can be welded or otherwise affixed, or removable from the skimmer 314. The pivot 314 is under the center of the stopper 310. The skimmer has round stopper 316 and a mechanical rotational stop pin 318. By turning the device in the direction of arrow 320, the holes in the device remain open. By turning the device in the direction of arrow 322 the holes in the device close.

FIG. 4 shows an exploded view of the device 400. The device comprises a stopper control rod 410 which comprises a rotation knob 412 and a rod 414. The top of the device has a flange with socket 416 located at the pivot 418. The top of the device further has a stopper 420, solid area 422 and holes 424. The rotation knob opens in arrow direction 426 and closes in arrow direction 428. The reservoir part 430 of the device comprises a strainer with integral reservoir wall 500, having a reservoir wall 510 and a pivot 512. The lower portion of the device further comprises a solid area 514 and strainer holes 516. The device has mechanical stops 518 and 520 extending from reservoir wall 510. A handle 522 is attached to the wall of the reservoir.

Figure 5A:
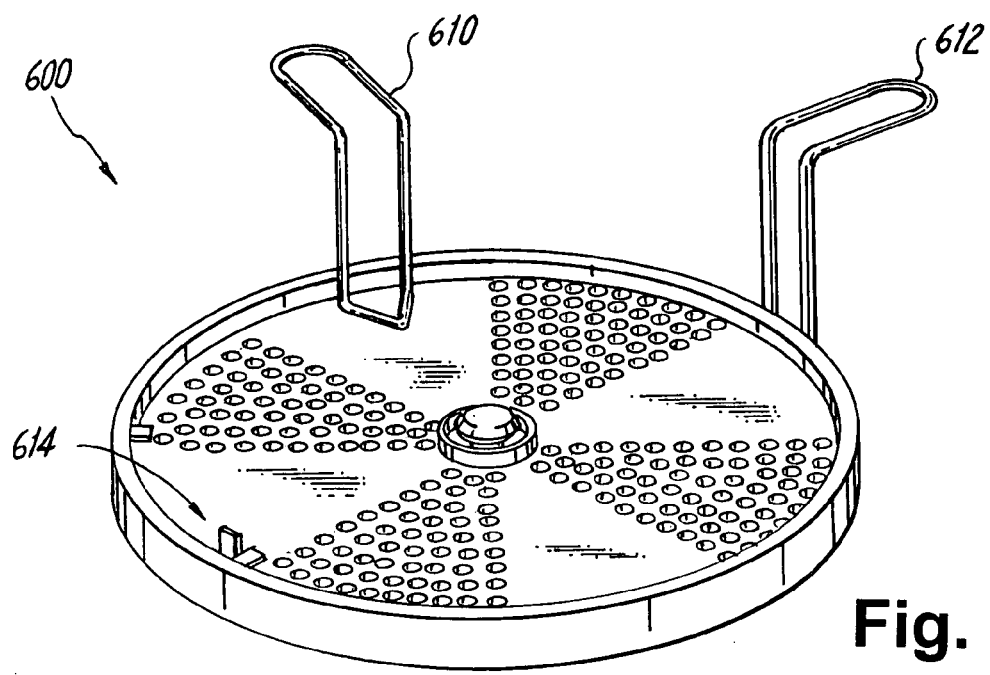
FIGS. 5a and 5b shows an example of how the device works.
Figure 5B:
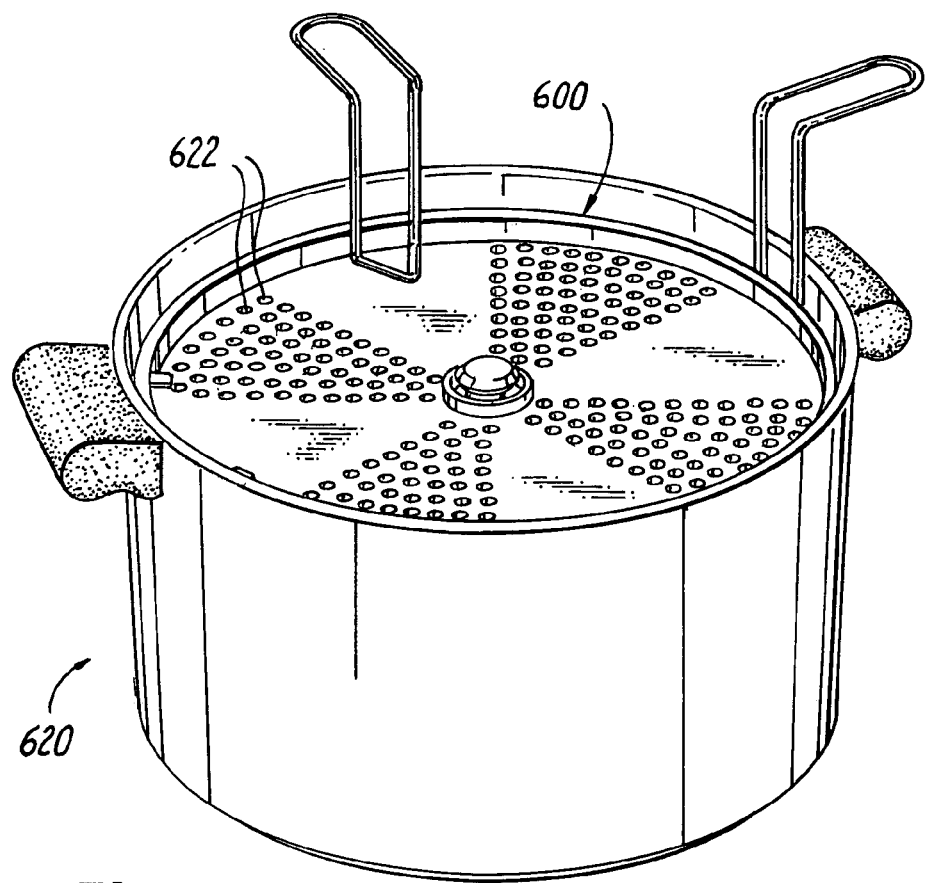

FIG. 5 shows the skimmer strainer device 600 having a stopper control 610 in the open position, a handle 612 and a mechanical stop 614 also in the open position. The skimmer strainer device 600 is lowered into pot 620. A layer of fat or other similar solid or liquid is located at the top of the liquid in the pot 620. The liquid enters through the holes 622. The stopper control 610 is then rotated to close the holes forming a solid area wherein the fat or other similar solid or liquid is trapped within the reservoir. The skimmer strainer device 600 is then removed from the pot 620 removing the fat or other similar solid or liquid from the pot. The process can then be repeated if necessary.

The invention claimed is:

1. A method for skimming a liquid, foam, fat, or other similar substance, which floats on top of another liquid comprising:

opening a stopper on a skimming device by aligning stopper holes with strainer holes;

partially lowering via a handle said device into a container of liquid;

holding said device just below top surface of said liquid;

forcing top layer of liquid up through said holes in said strainer at bottom of said device;

forcing liquid into reservoir area;

positioning stopper control rod to block holes in said strainer;

trapping said liquid within said reservoir; and withdrawing skimmer from said container.

* * * * *